United States Patent
Holden et al.

(10) Patent No.: US 6,226,298 B1
(45) Date of Patent: May 1, 2001

(54) METHOD AND APPARATUS FOR DETECTING DISABLED PHYSICAL DEVICES AND DELETING UNDELIVERABLE CELLS

(75) Inventors: Brian D. Holden, Sunnyvale; Brian D. Alleyne, Walnut Creek; Darren S. Braun, Fremont, all of CA (US)

(73) Assignee: PMC-Sierra (Maryland), Inc. (CA)

( * ) Notice: Subject to any disclaimer, the term of this patent is extended or adjusted under 35 U.S.C. 154(b) by 0 days.

(21) Appl. No.: 09/067,705

(22) Filed: Apr. 28, 1998

Related U.S. Application Data

(63) Continuation-in-part of application No. 08/966,073, filed on Nov. 7, 1997, now abandoned.
(60) Provisional application No. 60/029,543, filed on Nov. 8, 1996, and provisional application No. 60/033,029, filed on Dec. 12, 1996.

(51) Int. Cl.$^7$ .................................................. H04L 12/28
(52) U.S. Cl. .......................... 370/417; 370/236; 370/395; 370/413
(58) Field of Search .................................. 370/395, 396, 370/397, 400, 412, 413, 414, 417, 235, 423, 416, 296, 230, 236, 237, 225, 217, 218

(56) References Cited

U.S. PATENT DOCUMENTS

| | | | | |
|---|---|---|---|---|
| 5,062,106 | * | 10/1991 | Yamazaki et al. | 370/397 |
| 5,570,348 | * | 10/1996 | Holden | 370/296 |
| 5,583,861 | * | 12/1996 | Holden | 370/395 |
| 5,732,087 | * | 3/1998 | Lauer et al. | 370/416 |
| 5,757,799 | * | 5/1998 | LaRue | 370/423 |
| 5,793,748 | * | 8/1998 | Murase | 370/235 |
| 6,026,092 | * | 2/2000 | Abu-Amara et al. | 370/411 |

\* cited by examiner

Primary Examiner—Hassan Kizou
Assistant Examiner—Mitchell Slavitt
(74) Attorney, Agent, or Firm—Townsend and Townsend and Crew LLP; Kenneth R. Allen

(57) ABSTRACT

A system and method for flushing cells in an ATM network sets an interval timer during which it would be expected that an active physical output would indicate it could accept a cell. When an interval elapses, a physical output that has not indicated it is ready to accept a cell is marked as disabled and may remain so until the output is reset. Cells in an output queue to a disabled cell are flushed during periods when no higher priority cells are available to be sent.

15 Claims, 2 Drawing Sheets

METHOD AND APPARATUS FOR DETECTING DISABLED PHYSICAL DEVICES AND DELETING UNDELIVERABLE CELLS

This application claims priority from provisional patent application Ser. No. 60/029,543 filed Nov. 8, 1996 and from provisional patent application Ser. No. 60/033,029 filed Dec. 12, 1996, both of which are incorporated herein by reference for all purposes. This application is also a continuation in part of application Ser. No. 08/966,073, filed Nov. 7, 1997, now abandoned.

BACKGROUND OF THE INVENTION

This invention relates primarily to a class of digital communication systems known as asynchronous transfer mode (ATM) switching systems and more generally to intercomputer communications architectures. The invention more specifically relates to systems and methods for removing undeliverable cells in an output routing table within an ATM network.

A building block in a switch-fabric architecture ATM switch system is a structure known as a switch element. A switch element provides packet signal routing from one of a plurality of input ports to one or more of a plurality of output ports by maintaining an array of crosspoints for connecting any input port to any output port. Switch elements may be aggregated in various patterns to provide arbitrarily large N by N possible interconnection of input ports to output ports.

Another building block in a switch-fabric architecture ATM switch system is a structure known as a routing table (RT). In an ATM switch there generally is functionally an output routing table (ORT) and an input routing table (IRT).

One solution to the problem of buffering cells as they flow through various switch devices, including RTs, is the use of a shared pool of memory for storing queued cells. A shared pool more effectively utilizes available memory. However, a shared pool is also more susceptible to various types of "blocking," wherein cells which are delayed within the shared pool block the passage of other cells through the device when these other cells might otherwise be able to be transmitted through a device.

Increasing demands for communications speed and capacity have created a need for a higher performance ATM architecture as described in 60/033,029. This architecture differs from an earlier architecture designed by one of the inventors of the present invention in that the primary shared pool memory areas are associated with an input routing table (IRT) and output routing table (ORT). Shared pool buffer memories associated with individual switch elements are generally used only when handling multicast traffic. The new architecture is different also in that it provides for a number of virtual outputs (VOs) for each output line from an ORT and a number of virtual inputs (VIs) for each input line to an IRT. In one specific embodiment, the ORT and IRT are combined into a single device referred to as a Quad Routing Table (QRT). The QRT may be used in connection with a switch fabric constructed of switch elements (SEs) as described in earlier applications or may be used in connection with a switch fabric made up of update quad switch elements (QSEs) as described in 60/033,029.

In various reference materials and in the 60/029,543 application, a VO of a QRT connects to a PHY. A PHY (for PHYsical connection) generally represents a connection to a different physical device. In a telephone network, the different PHYs might be trunk lines to different cities; in a wide-area-network router, the PHYs might be connecting to different floors in a building; in a local-area-network switch, the PHYs might be different individual workstations. Throughout this document, the term VO should be understood to be connected to a PHY, unless the context requires otherwise.

A particular problem that can arrive in a switch architecture with VOs and some type of shared buffer space is what happens when one of the physical connections to which a VO is connected unexpectedly becomes disabled or broken. In general, it will take some time for higher layer communication protocols to detect that a VO cannot receive data. During that time, cells queued for the disabled VO may fill up the buffer pool in the ORT, thus degrading the performance of delivery of cells directed to other VOs which remain operational. Furthermore, in many ATM applications, such as live telephone or video, once a cell has been delayed even a short time from when it was expected, the cell effectively becomes stale and delivery of stale cells would be worse than non-delivery of those cells. In various references in the art, identifying and eliminating from an ATM system stale or undeliverable cells is referred to as cell flushing.

Some prior-art ATM architectures do not have specific mechanisms for detecting and flushing cells in an ORT that are directed to a particular disabled VO. If one of the VOs breaks, traffic to that VO back up, disrupting traffic to other VOs of the ORT. In this case, the only alternative is to reset the entire ORT, thereby deleting all of the cells that are pending in the ORT.

A different technique is to have a mechanism within the ORT that accurately knows the rate that a VO is expected to be able to receive cells. In this technique, if one of the VOs stops accepting cells, the ORT can force that VO to accept cells anyway at the rate it would expect the VO to normally accept cells. This solution is complex to implement, however, in terms of both hardware and processing of cells.

A different technique is to include a special flushing dequeue routine, different from the normal dequeue mechanism, for removing undeliverable or late cells. This solution is also complex to implement and expensive in terms of gates and processing.

What is needed is a method or apparatus for an ATM architecture having shared resources in an output routing table that allows the ORT to effectively detect and delete cells directed to physical connections or virtual outputs that are disabled.

SUMMARY OF THE INVENTION

The invention is a method and/or mechanism for detecting when a particular VO has stopped accepting cells. In one embodiment, the detection system can be implemented in a very small number of gates by defining an interval which is longer than the interval in which it would be expected that a VO would indicate it could accept at least one cell. A flag is then set to a first state at the start time of the interval. Whenever during the interval a VO indicates that it is ready to accept a cell, the flag state is changed to an active state. At the end of the interval, the flag for a VO is examined and if it remains in the first state set at the beginning of the interval, it is concluded that a VO has become disabled.

In a very compact implementation, only two bits of state per VO are necessary, and a single interval count is used for all VOs. In a further aspect of the invention, cells in an ORT directed to a disabled VO are marked with a lowest priority and are processed during otherwise inactive bandwidth time by the ORT using the normal ORT dequeue routine to clear the cells from the ORT memory. A variation on a simply embodiment includes a additional enable bit per VO. The enable bit is set by the ORT controller to indicate that a VO is enabled. Once a VO has been marked disabled, it remains marked disabled until the controller resets the enable bit.

In a specific embodiment, the invention may be described in terms of the transmit or egress UTOPIA interface having a function called the WatchDog. The WatchDog exists to protect the QRT Virtual Output queues from overflow in the event that a PHY sink connected to a VO goes off line or stops requesting cells. The WatchDog can be configured by way of the UTOPIA CONFIG register in the processor interface. The WatchDog can be turned off or set to tolerate either OC-3, DS1 or DS0 level outputs. The WatchDog operates by observing the liveliness of the Transmit ATM Cell Available signals. When a PHY is detected to have stopped accepting cells, the cells intended for that PHY are played out using the standard dequeue mechanism with otherwise normal UTOPIA signalling (in one variation) at the lowest priority whenever spare bandwidth is available. This is done in the event that the PHY can accept these cells and the nature of the cell available response dormancy is due to a stuck-at fault. Cells also may be dequeued by the normal dequeue routine without playing-them out to the PHY.

Numerous alternative implementations are possible and the invention should not be limited except as in the attached claims. The invention will be further understood with reference to the drawings of specific embodiments described below.

DETAILED DESCRIPTION OF THE DRAWINGS

Figure 1:
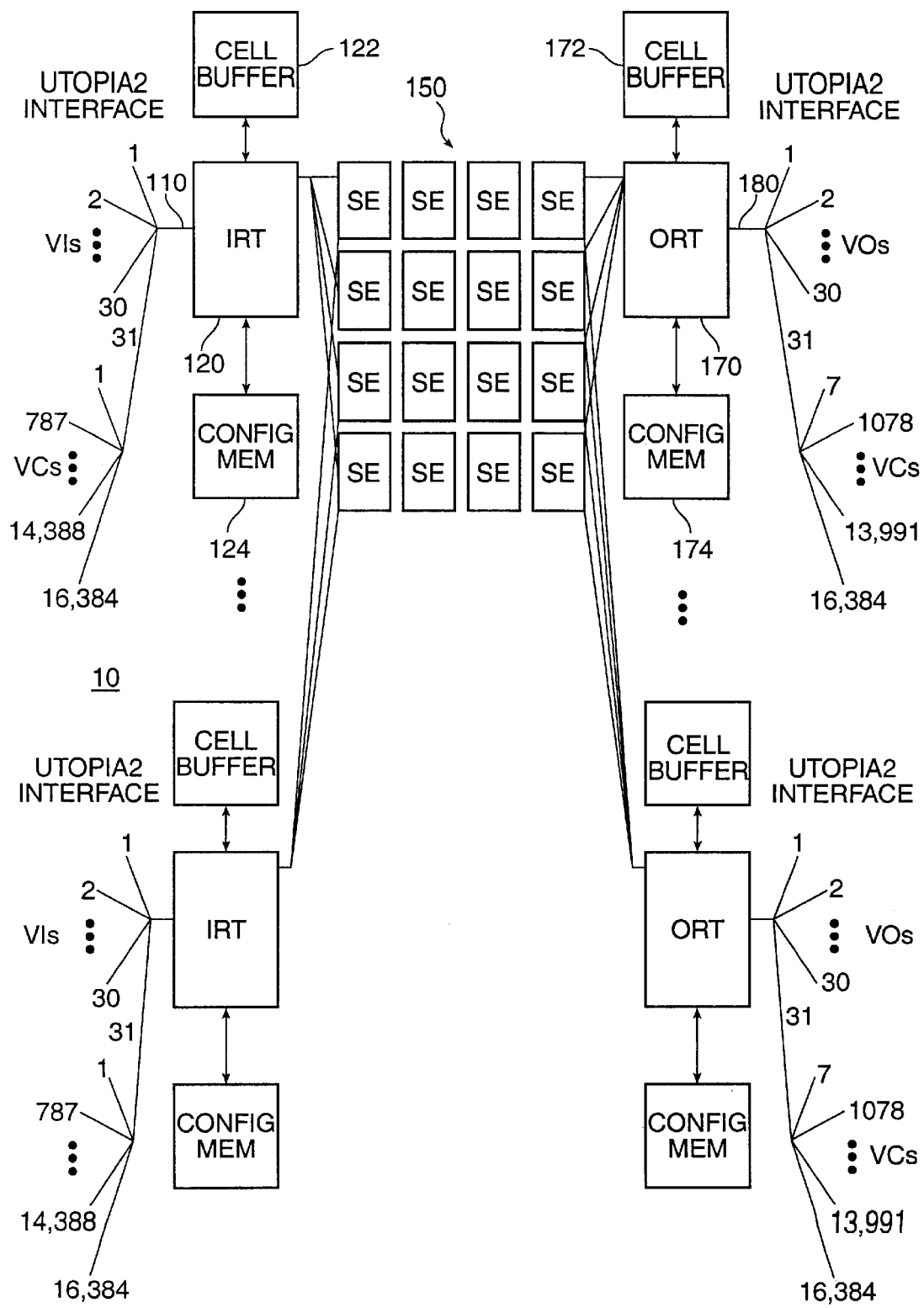
FIG. 1 is a block diagram of one type of ATM network in which the present invention may be employed.

FIG. 1 shows a representation of an ATM network 10 as an example of an ATM architecture with virtual outputs, in which the invention may be employed. ATM network 10, as illustrated, contains input transmission line 110, input routing tables (IRTs) 120, an N×N switch matrix 150, output routing tables (ORTs) 170, and output transmission lines 180. Associated with IRT 120 is cell buffer memory 122 and configuration memory 124. Associated with ORT 170 is cell buffer memory 172 and configuration memory 174. ATM cells, which are digitized packets corresponding to a voice or video signal or a data stream, are sent through an input transmission line 110 into a connecting IRT 120. The IRT 120 ascertains the cell's routing and determines an entry point into the switch matrix path, based on a particular algorithm, including a random-entry algorithm.

Cells are arranged in queues within a buffer memory 122 associated with IRT 120 and are then transmitted through the switch matrix 150. Upon exiting the switch matrix, a cell is sent to one (or possibly more than one in the case of multicast cells) of the N ORTs corresponding to the cell's destination address. Within the ORT 170, received cells are queued in a plurality of queues in cell buffer 172 and subsequently transmitted onto a connecting output transmission line 180. In one embodiment, queues are defined on a per VO basis. In a further embodiment, VOs actively signal back to ORT, in response to a poll from the ORT, each time that they are ready to accept a next cell. In this manner, an ATM network can route audio, video or data signals, each requiring different bandwidth and transmission speeds.

In one type of ATM in which the invention may be employed, in order to manage cells flowing through an ATM network, cells are grouped into virtual channels (VCs). A VC can be thought of as a sequential stream of cells flowing from a source to a destination, generally representing a single connection such as a single telephone call. The channel is referred to as a virtual channel because there is not generally a dedicated path within the ATM switch from the source to the destination; the actual path may vary from transmission to transmission, or even during transmission, depending upon the type of traffic sent, whether congestion occurs, or other factors.

In the specific embodiment shown, each input transmission line can carry cells from a plurality of virtual inputs (VIs), which number 31 in a specific embodiment. Likewise, each output transmission line can send cells to a plurality of virtual outputs (VOs), which number 31 in a specific embodiment. The ATM switch can keep track of 16K VCs and a particular VC can occur between any VI and any VO. A VC may be thought of as a stream of cells travelling from a particular VI to a particular VO and having a particular transmission priority.

In many ATM switches, cells or VCs are assigned a service class (SC) (sometimes referred to as a priority). The SC defines certain handling within the ATM switch, such as priority of throughput or the amount of available bandwidth that a particular VC is allowed to occupy.

In one type of ATM network in which the invention may be effectively employed, cells in an ORT are grouped and queued according to VOs. Supporting VOs allows the cell to be routed to different physical receivers out of the same ORT output line, with data multiplexed to the different output receivers by a device outside of the ORT.

In general terms, the invention comprises an improved ORT 170 that includes a watchdog mechanism for detecting when any of its VOs have stopped accepting cells. An embodiment also includes a mechanism for flushing cells. In an embodiment, cell flushing is accomplished by marking cells to be flushed, such as with a particular SC level, and then processing those cells out of the ORT cell buffer in the normal way during otherwise idle cell cycles.

Figure 2:
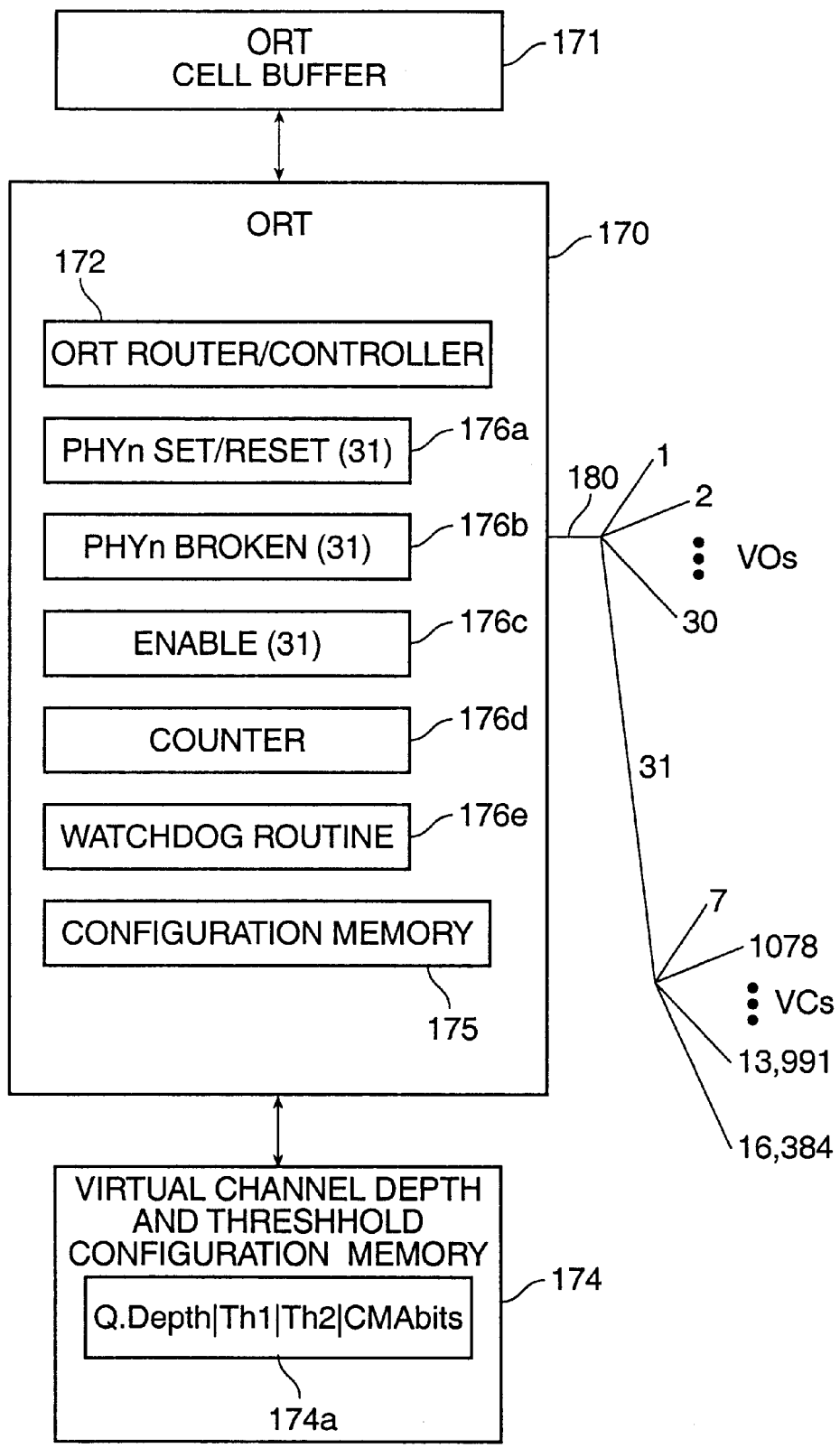
FIG. 2 is a block diagram of an ORT showing a cell flushing counter registers and a watchdog routine according to one embodiment of the invention.

FIG. 2 show a more detailed example of an ORT 170 with memory locations 176a–c for recording and determining the status of VOs. According to an embodiment, in order to detect when a VO has become disabled, a counter 176e is provided within ORT 170 in order to time an interval that is set to be longer than the MAXIM expect internal between a VO indicating acceptance of cells. Other, more complex embodiments that shown in FIG. 2 are possible, which use multiple counters, possibly one counter per VO. The diagram of FIG. 2 represents a simpler and easier to implement embodiment.

It will be understood that counter 176d and flags 176a–c may be implemented in a variety of ways. One mechanism for implementing counter 176d is as a simple binary counter associated with a QRT and shared among devices in the ORT, combined with an interval compare counter which is settable to a specific interval for an ORT. One mechanism for implementing flags 176a–c is as three dedicated bits per VO. At the end of every interval, the current active/disable bit for a VO is ORed with the history (or broken) bit for that VO and the results stored back in the history bit.

Mechanism For Detecting That A VO Has Stopped Accepting Cells

In order to detect a disabled VO, the invention defines a minimum expected rate (MER). More than one MER may be defined for different VOs, but in a specific embodiment, one MER will be defined over all VOs and will be set so that it is longer than would be expected from the slowest VO to which the ORT is sending.

Functionally, the invention keeps a count of the time it has been since the last time each VO has indicated it can accept a cell, and when a time has elapsed that is much longer than the MER, the invention concludes that a VO has become disabled.

As just stated, it might be thought that it would be required to record the time that each VO last indicated it could accept a cell and maintain a counter for each VO, which would be elaborate in terms of processing and hardware. According to one very compact embodiment, however, the invention achieves essentially the above-stated functionality by having only one counter and two or three bits of state for each VO.

In this compact embodiment, a PHYn SET/RESET bit 176a is set for each VO at time $T_0$, as measured by counter signal 176d which is either a local clock or a signal generated external to the circuit illustrated. Whenever a VO indicates it is ready to accept a cell, its corresponding bit in 176a is reset. At time $T_1$, which represents a long measurement interval of time designed to be substantially longer than the MER, the bits in 176a are examined and any bit that remains set indicates a VO that has become disabled. (In alternative embodiments, register 176a may be copied into 176b, or pointers to the registers may be swapped.)

Thus, with just an interval timer, two bits per VO, and a way to reset a bit per VO when a VO indicates it is ready to accept a cell, disabled or broken VOs may be detected. This represents a mechanism for implementing a very elaborate function on an ATM using very few circuit gates.

A further embodiment includes a third bit per VO, such as register 176c, which is an enable bit. This enable bit turns its respective PHY/VO on or off and when the bit is set to on it has the function of clearing the history bit (also referred to as the WatchDog expiration bit).

In the illustration shown, watchdog routine 176e may be understood to be hardware and/or software components to interact with the elements just described to accomplish the described functions. Routine 176e will be tightly integrated with the function of controller 172 which provides other ORT functions as described in the cited provisional application and as known in the art. Among those functions will be signaling to higher layer protocols that a VO has become disabled.

Mechanism For Removing (Flushing) Cells

Once the ORT has determined that a particular VO is no longer able to accept cells, some type of action must be taken to remove and discard those cells from the ORT cell buffer 171 that are addressed to that VO.

According to a further embodiment of the invention, flushing is accomplished without the need for additional cell removal routines by marking cells to be removed and then processing those cells according to the standard routing routine during otherwise idle cell-cycles.

In a specific variation of this embodiment, this is accomplished by defining a priority or service class (SC) that is lower than any active priority, and marking any cell directed to a disabled VO with this different priority, which can be referred to as a flush priority. Within the ORT, whenever there are no cells to send at any of the functional priorities, the ORT fetches a cell from ORT buffer 171 with the flush priority and either just deletes it or sends it to output line 180 to the appropriate VO on the chance that the VO can actually receive the cell even though it has not indicated that it is ready to receive a cell. In this way, cells are flushed from the ORT without the need for a different flush routine.

At a higher layer, an ATM control processor may be notified that a particular VO has stopped accepting cells and higher layer protocols will handle the disconnection and signal to a transmitter to stop transmitting cells. In one embodiment, a message is sent back to IRT 120 to inform the IRT to stop sending cells through the switch to that ORT.

The invention has now been explained in accordance with specific embodiments, however, many variations will be obvious to those skilled in the art. The invention should therefore not be limited except as provided in the attached claims and allowable equivalents.

What is claimed is:

1. A method within an ATM output routing table for detecting that an output queue destination has become inactive, comprising:

defining a time interval with a beginning and an ending, said time interval substantially longer than an expected interval between when a destination would indicate it was ready to receive a cell;

at said beginning, setting a state for said destination to a disabled state;

during said interval, setting said state to an active state if said destination indicates it is ready to receive a cell; and at said ending, marking said destination disabled if said state remains in a disabled state.

2. The method according to claim 1 further comprising:

at said beginning, setting at least one state bit for each of a plurality of destinations to a disabled state;

during said interval, setting a state bit for a particular destination to active if said particular destination indicates it is ready to receive a cell; and at said ending, marking each destination as disabled if a bit corresponding to that destination remains in a disabled state.

3. The method according to claim 1 further comprising checking the state of an enable bit to determine whether a first state bit contains valid data.

4. The method according to claim 1 wherein said interval is set to be substantially longer than the expected time between two indications from the slowest destination that it is ready to receive a cell.

5. The method according to claim 4 further comprising:

if said destination is marked disabled, deleting any pending cells in said routing table directed to said destination.

6. The method according to claim 5 further comprising:

if said destination is marked disabled, marking pending cells to said destination in said routing table as cells to be deleted;

deleting marked cells during otherwise idle bandwidth.

7. The method according to claim 4 further comprising:

if said destination is marked disabled, changing a priority of pending cells to a priority below the lowest active priority; and handling cells marked with the lowest priority using a dequeue routine also used for handling other cells when there are no higher priority cells to be output.

8. A circuit capable of detecting disabled destinations comprising:

an interval count for counting an interval during which a destination would be expected to accept a cell;

a first memory for holding state for a destination, said memory set to a first state at the beginning of an interval counted by said interval count;

a watchdog routine for detecting when said destination is ready to accept a cell and for changing said memory to a second state in response thereto, said watchdog routine further enabled at the end of said interval to determine if said memory is in said first state or said second state and to take action to delete any pending cells for said destination if said memory is in said first state.

9. The device according to claim 8 further comprising a second memory for storing the final state of said first memory during a next interval.

10. The device according to claim 9 further comprising a third memory for storing an enable state of said destination.

11. An output routing table capable of detecting disabled destinations comprising:

a counter signal input;

a connection to a plurality of virtual outputs, at least one virtual output able to indicate to said output routing table that it is able to accept a cell;

a plurality of first state memories capable of holding at least two states per virtual output, said memories set to a first state at the beginning of an interval counted by said interval counter;

a watchdog routine for detecting when virtual outputs are ready to accept a cell and for changing said state memories corresponding to said virtual outputs to a second state said watchdog routine further enabled at the end of said interval to determine if said memory is in said first state or said second state.

12. The device according to claim 11 further comprising:

a plurality of second state memories for storing states of said virtual outputs at the end of a previous interval during a next interval.

13. The device according to claim 12 further comprising a plurality of third state memories for storing an enable state of said destination.

14. The device according to claim 11 wherein said watchdog routing is further capable of marking pending cells to a virtual outputs based on a the value of said state memory.

15. A method for sending cells in a network through a switch with a shared buffer pool comprising:

receiving cells from a plurality of sources into a shared buffer pool prior to sending said cells to a plurality of outputs, said outputs individually indicating that they are ready to receive cells from said pool;

determining an interval that is longer than the longest interval expected between two indications that the slowest output is ready to accept a cell from said pool;

initiating a count and setting a bit per said outputs to a first state;

when any output indicates it is ready to accept a cell, setting a bit associated with that output to a second state;

detecting an ending of said interval at examining the state of bits associated with said outputs;

marking an output as disabled when a bit corresponding to that output remains in said first state;

sending cells from said pool to active outputs according to a standard send routine;

deleting cells from said pool to disabled outputs according to said standard send routine.

* * * * *